July 23, 1957     H. F. SEILS     2,800,089
BAKER'S PEEL
Filed July 15, 1953
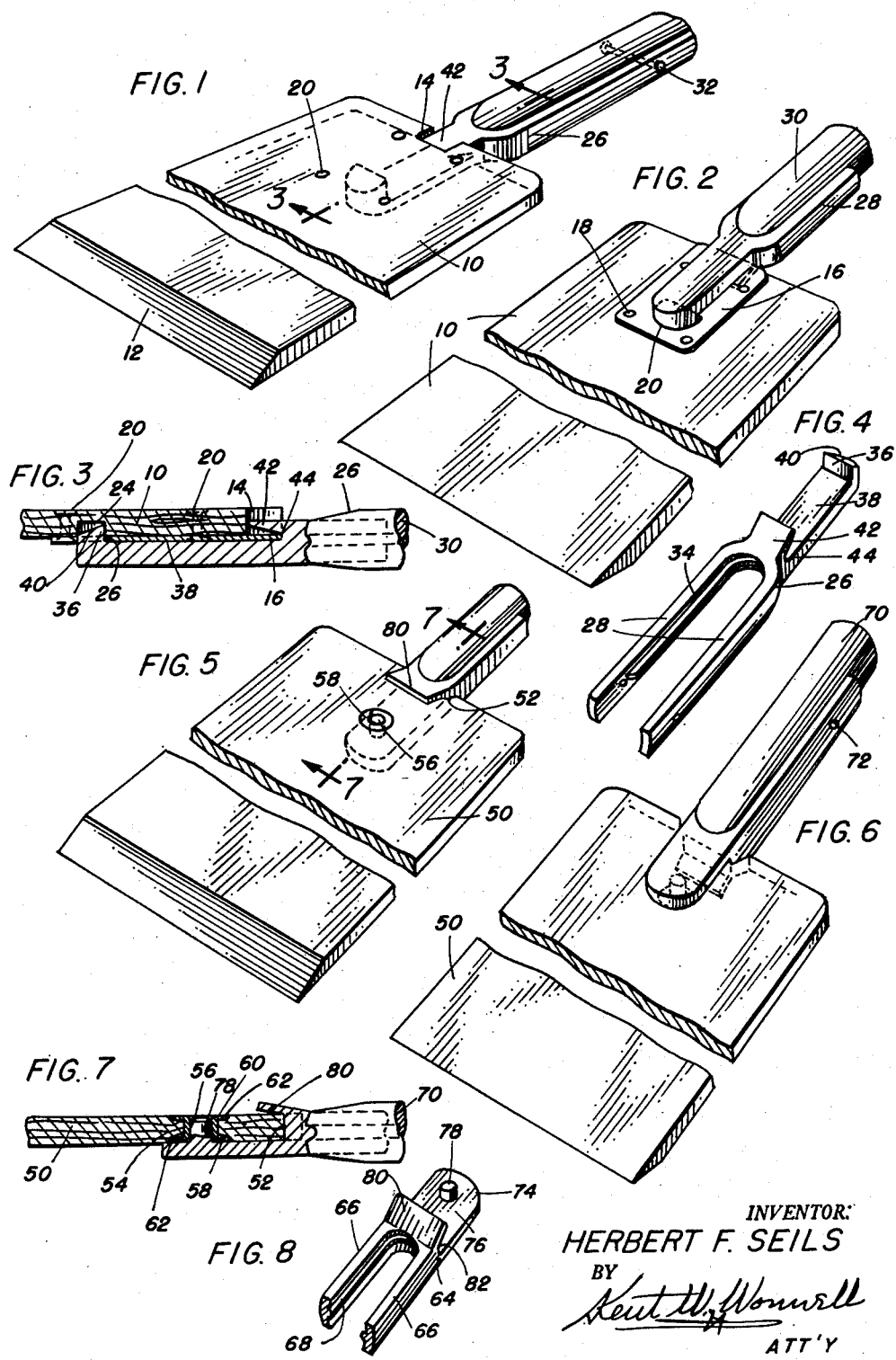
INVENTOR:
HERBERT F. SEILS
BY
ATT'Y United States Patent Office 2,800,089
Patented July 23, 1957

2,800,089

BAKER'S PEEL

Herbert F. Seils, Huntington, Ind.

Application July 15, 1953, Serial No. 368,145

8 Claims. (Cl. 107—67)

This invention relates in general to a baker's peel and is more particularly described as an improved disengageable attachment which will provide more peeling surface without increasing the length of the peel or will provide the same peeling surface with a shorter peel.

In the usual baker's peel, a metal plate is inserted in a slot at the rear edge which extends forwardly in the plate and provides an opening through the peel which is engaged by a projection of the handle bracket, thus making the end portion of the peel unavailable for the engagement of material thereon for a considerable space from the end of the peel.

The present invention relates to a handle attachment bracket which engages the under side of a peel with a projection which does not extend to the upper face of the peel and provides no projection on the upper face of the peel for engaging the material at the top of the peel, thereby adding more unobstructed space to the upper face of the peel and thereby increasing the capacity of the particular peel or making it possible to provide a peel of shorter length to do the same work.

An important object of the invention is to provide a baker's peel having more peeling surface, lightening the weight of the peel if a shorter peel is used.

A further object of the invention is to provide an improved sanitary peel which has no cracks or openings for the collection of dirt.

A still further object of the invention is to avoid an inserted plate at the attachment end of a peel, thereby eliminating the break-out of the plate due to a load on the peel.

A further object of the invention is to avoid splitting and weakening of a peel by slots and rivets therein.

Still a further object of the invention is to provide an easily connected attachment by inserting a projection in a small cut-out specially provided for handle attachment.

Still a further object of the invention is to provide an improved peel which eliminates plates, rivets, slots and cut-in at the end of a peel for a plate, all of which have a tendency to weaken the peel.

Other objects of the invention will appear in the specification and will be apparent from the accompanying drawing in which, Figs. 1 and 2 are perspective views of the upper and lower side of a baker's peel in accordance with this invention and a handle attachment therefor, the parts of the handle and of the peel being broken away.

Fig. 3 is a sectional view taken on the line 3—3 of Fig. 1.

Fig. 4 is a perspective view of the handle attachment bracket shown in Figs. 1 and 2.

Figs. 5 and 6 are top and bottom views of an improved peel in which a single eyelet is engaged by a projection at the under side of the handle bracket in accordance with this invention.

Fig. 7 is a sectional view taken on the line 7—7 of Fig. 5; and Fig. 8 is a perspective view of the attachment end of the bracket shown in Figs. 5, 6 and 7.

In a baker's peel, it is desirable to provide a handle which may be quickly disengaged from the peel blade by tilting the handle and the attachment bracket relative to the blade and providing an arrangement which may be quickly engaged by reversing the above disengaging action.

The ordinary handle attachment requires a considerable portion of the end of the blade which must be used for engagement of the handle bracket, some peels having a plate which projects on the top of the peel or rivets which extend from an inserted plate at the end of the peel. This requires an additional space at the top of the peel which cannot be used for baked material as it will be engaged and damaged by contact with the attachment bracket during the ordinary use of the peel.

The present invention overcomes these objections by providing a handle bracket which has a very limited engagement with the upper face of the peel at the edge only with a projection at the bottom which either engages a slot in a bottom plate as shown in Figs. 1–3 or it engages an eyelet extending through the peel blade as shown in Figs. 5, 6 and 7 with no obstruction on the upper face of the plate for this engaging means so that a greater portion of the upper end of the blade may be used closer to the end thereof for holding the baked material thereon.

Referring now more particularly to the drawing, a peel blade 10 is shown in Figs. 1 and 2 which may have a pointed extremity 12 at one end and a shallow rectangular notch 14 extending through the blade centrally of the other end. At the under side of the blade, a metal plate 16 is secured by rivets 18 or other suitable fastening devices which extend through to the top of the peel where heads 20 of the rivets are counter-sunk in the peel blade to be flush with the surface thereof. At the inner end of this plate is an opening 22 with a corresponding recess 24 extending from the bottom of the blade 10 and only partially through the blade so that this recess does not appear at the upper face of the blade.

To connect and engage this peel, a bracket 26 is provided usually having a yoke 28 at one end to which a handle 30 is attached by a rivet 32 extending through the ends of the yoke and through the handle. The handle may be additionally secured in place by means of an internal rib 34 in the yoke which requires a corresponding groove in the handle to make it fit tightly therein. At the other end of the bracket is a projection 36 spaced from the yoke by a flat portion 38 and the projection is of a size and shape to engage loosely in the opening 20 of the plate 16 and to extend into the recess 24 of the peel blade. The upper extremity 40 of the projection 36 may be beveled to be engaged more readily in the openings of the plate 16 and the recess of the peel blade. Adjacent the yoke and rounding upwardly from the flat portion 38 of the bracket is an engagement lip 42 forming an under-cut recess 44 of a thickness to engage the edge of the plate 16 which projects at the bottom in the recess 14, the depth of the recess from the end being sufficient to engage therein, the lip 42 as shown more clearly in Fig. 3.

With this construction, the handle with the attached bracket 26 is applied to the end of the peel by engaging the lip 42 over the edge of the plate 16 in the recess 14, seating the end of this plate in the recess 44 which will space the projection 36 to engage in the opening 20 of the plate 16, seating the beveled end 40 in the recess 24 of the peel blade.

With this construction, there is no obstruction at the top of the peel blade and the baked or to be baked material may be positioned on the top of the peel blade up to the end of the peel or at least up to the edge of the recess 14 without danger of any damage thereto, thus utilizing the greater portion of the end surface of the blade. In the form of the invention shown by Figs. 5–8, a peel blade 50 has a shallow notch 52 extending entirely through the blade at the attachment end and at a short distance therefrom is an opening 54 through the blade for receiving a hollow rivet 56 therein. This rivet has a head or flange 58 which is counter-sunk below the surface of the peel 50 and the lower or under side has a reduced flange 60 which is up-set outwardly over the edge of a ring 62 which is also counter-sunk in the bottom of the peel at the edge of the opening 54 so that the edges of the rivet are below the surface or at least flush with the opposite surfaces of the peel blade.

An attachment bracket 64 for engaging the peel blade has a yoke 66 with an inner rib 68 for engaging the end of a handle 70 which is secured in the bracket by a rivet 72 passing through the ends of the yoke and the inserted end of the handle, holding the handle firmly in place. An opposite projecting end 74 of the bracket has a flat surface 76 and a rounded outer extremity with a pin 78 projecting upwardly from the surface 76. At a distance from the end 74 is an upwardly projecting lip 80 having an under-cut recess 82 adapted to embrace the thickness of the end of the peel blade 50 at the inner edge of the notch 52. When this attachment member is applied to the end of the peel blade, the inclination of the lip 80 is such that when it is moved against the top of the peel blade, the projection 78 will clear the edge of the opening in the hollow rivet 56 so that upon moving the handle 70 downwardly, the projection 78 will engage in the hollow rivet and will form a firm connection therewith so that the peel blade may move inwardly and outwardly, and the blade will be supported by the handle attachment.

With this construction, a greater usable space is provided at the top of the peel blade than for other types of peel blades which have comparable handle attachments. This construction therefore provides more peeling surface for the blade or will permit the use of a shorter peel blade to accommodate the same load thereon, thus lightening the weight of the peel. No cracks or openings are provided at the end of the peel blade and there is no splitting or weakening of the blade by the insertion of slots and rivets in the end and through the body of the peel. By this elimination of the plates, rivets, slots and cuts in the peel blade, a stronger more sanitary and lighter blade is possible to accomplish the same amount of work. The peel blade is easily attached and detached by simply raising and lowering the handle in a well known manner.

While preferred embodiments of the invention have been described in some detail, they should be regarded as illustrations or examples rather than as limitations or restrictions of the invention, since various changes in the construction, combination, and arrangement of the parts may be made without departing from the spirit and scope of the invention.

I claim:

1. In a baker's peel having a blade and a detachable handle to engage one end thereof, the blade having an opening in its central portion adjacent its handle end extending upwardly from its under side, and the upper blade face constituting a flat unobstructed work supporting surface over its entire extent, the handle having an attachment bracket with a lip to engage the handle end of the peel, the blade having a recess in the handle end substantially as wide as the attachment lip for reception of the same and said opening being spaced inwardly from said recess and a projection less in height than the thickness of the blade at said opening spaced inwardly from said lip and recess and located on the free end of the bracket, adapted to engage in the opening in the bottom of the blade when the lip is engaged with the handle end of the blade and the projection end of the attachment bracket is swung upwardly at the bottom in the direction of the blade.

2. A baker's peel in accordance with claim 1, in which the opening extends through the blade and the projection of the attachment bracket is spaced from the lip by a portion with a flat upper surface extending to the lip and spaced from the bottom of the lip not more than the thickness of the blade at the opening in the end engaged by the lip.

3. A baker's peel in accordance with claim 2, in which the blade opening has a metal ferrule flush with the upper surface of the blade into which the said projection extends.

4. A baker's peel in accordance with claim 2, in which a hollow rivet is inserted into the opening of the blade with flanges at both sides of the blade counter-sunk therein so that the surfaces of the rivet are at least flush with the surfaces of the blade.

5. A baker's peel in accordance with claim 4, in which the hollow rivet has a flanged portion and is inserted in the opening from one side of the peel blade and has a retaining flange through which the rivet is inserted at the other side of the blade, the portion of the rivet inserted through the retaining flange being bent against the flange so that it is also flush with the surface of the blade.

6. A baker's peel in accordance with claim 1, in which the free edge of the lip is inclined upwardly above the flat surface a sufficient distance to swing the projection downwardly free from the bottom of the opening in the blade for attaching and detaching the handle and its bracket from the peel blade.

7. A baker's peel in accordance with claim 1, in which the bottom of the peel is protected by a plate attached thereto and having an opening spaced from the handle end of the blade and registering with the opening in the blade at the under side adjacent the handle end.

8. A baker's peel in accordance with claim 1, having a metal plate at the bottom of the peel blade overlapping the recess at the handle engaging end of the blade so that the lip of the attachment bracket is seated in the recess of the blade above the plate attached at the bottom thereof, and the plate has an opening spaced from the handle end thereof and registering with the opening in the blade at the under side so that the projection of the attachment bracket may be engaged in the opening in the plate and the upper end of the projection will be seated in the opening at the under side of the blade.

References Cited in the file of this patent

UNITED STATES PATENTS

| | | |
|---|---|---|
| 1,195,510 | Schroeder | Aug. 22, 1916 |
| 1,906,281 | Schroeder | May 2, 1933 |
| 2,070,928 | Schroeder | Feb. 16, 1937 |